United States Patent

[11] 3,607,206

[72] Inventors Thomas V. Foster
Oberengstringen;
Hermann H. Nebelung, Binz-Maur, both of Switzerland
[21] Appl. No. 851,422
[22] Filed Aug. 19, 1969
[45] Patented Sept. 21, 1971
[73] Assignee Emhart Corporation
Bloomfield, Conn.

[54] PARISON FORMING UNIT FOR GLASSWARE FORMING MACHINE
10 Claims, 3 Drawing Figs.

[52] U.S. Cl. ............................................. 65/307,
65/236, 65/318, 65/319, 65/321, 65/323
[51] Int. Cl. ............................................ C03b 11/10
[50] Field of Search .......................................... 65/235,
236, 307, 318, 216, 319, 321, 322, 323

[56] References Cited
UNITED STATES PATENTS
2,508,890  5/1950  Rowe ............................. 65/321 X 3,158,391  11/1964  Carmi et al. ..................... 65/323 X
3,180,718  4/1965   Wilhelm .......................... 65/318 X
3,314,775  4/1967   Shetler et al. .................... 65/319 X

*Primary Examiner*—Arthur D. Kellogg
*Attorney*—McCormick, Paulding & Huber

ABSTRACT: At the blank mold or parison forming station of a glassware forming machine a neck ring mold mates with a blank mold to form an inverted parison cavity with a top opening into which a molten glass charge is dropped. A vertically reciprocable plunger is arranged to close the bottom of the cavity and a baffle subsequently closes the top opening. A plunger operating mechanism then raises the plunger to force the molten glass charge outwardly against the walls of the cavity, and especially into the neck ring mold, after which the plunger is withdrawn, and the blank mold and baffle are removed. The neck ring then swings the inverted glass parison over to a blow mold station for further forming. The plunger is free to float laterally in its holder to accommodate variations in alignment therebetween, and the baffle floats vertically to accommodate variations in the size of the molten glass charge.

INVENTORS
THOMAS V. FOSTER
HERMANN H. NEBELUNG
BY
McCormick, Paulding & Huber
ATTORNEYS

FIG. 2
FIG. 3
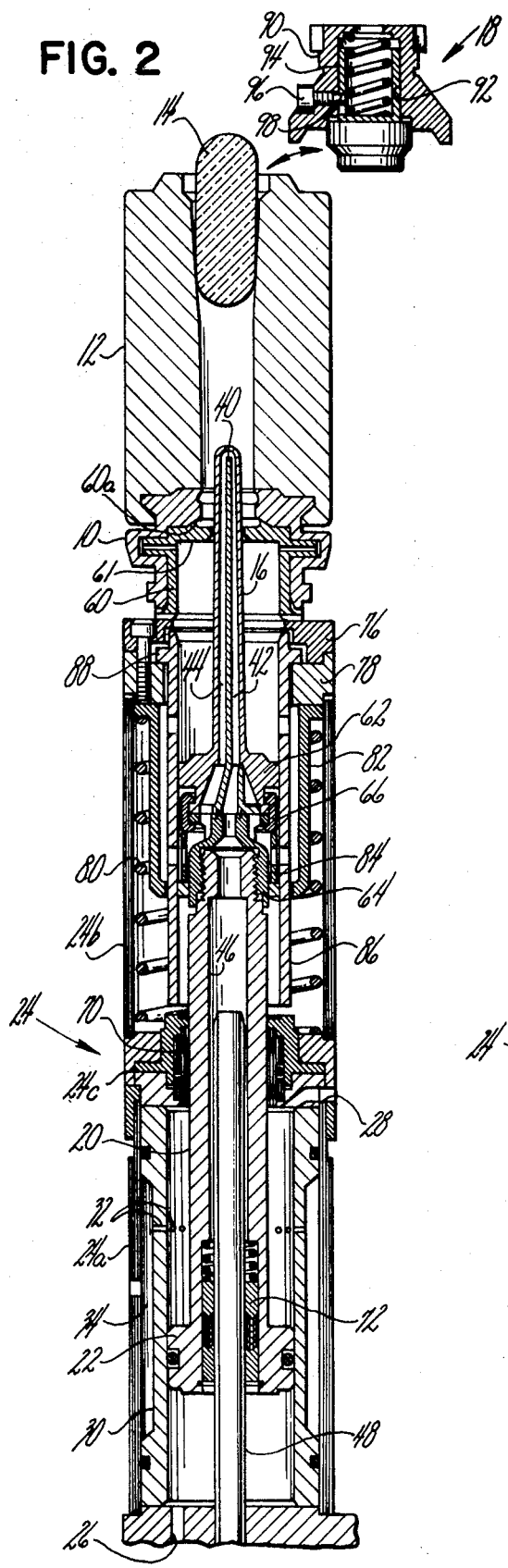
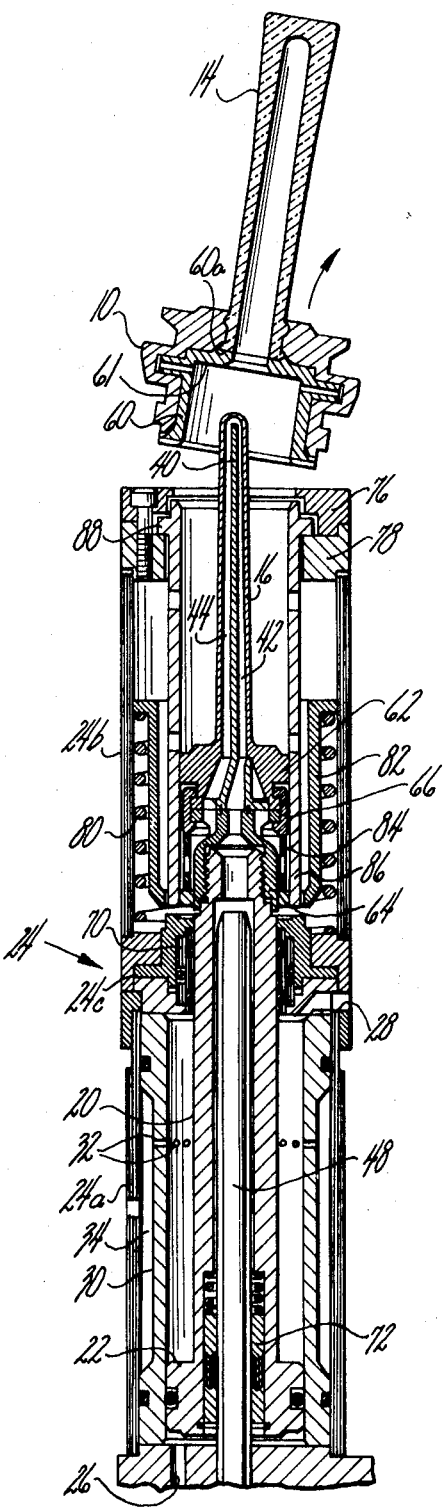

3,607,206

PARISON FORMING UNIT FOR GLASSWARE FORMING MACHINE

BACKGROUND OF INVENTION

The art of manufacturing glass containers by the so-called "press and blow method" in a Hartford I. S. machine is well known. In accordance with this method glass gobs or charges of nearly even or equal weights are fed from a source into an upwardly open blank mold which is subsequently closed by a baffle. A pressing plunger then moves upwardly into the blank mold to force the molten glass gob into the blank mold and into the associated neck ring mold after which the plunger is withdrawn and the blank mold and baffle removed so that the neck ring mold can swing the parison to the blow mold station of the Hartford I. S. glassware-forming machine. Downward movement of the charge is checked at a predetermined level within the blank mold and neck ring mold structure so that the charge is supported by the upper end portion of the vertically movable pressing plunger, which plunger allows a portion of the charge at the periphery of its tip to creep downwardly around the plunger. The charge is then raised as an entity by upward axial movement of the plunger within the blank mold to press the charge outwardly into molding contact with the internal walls of the inverted blank mold, and to displace a portion of the glass downwardly into molding contact with the walls of the neck ring mold. The plunger is then retracted downwardly after the pressing stroke to a level below that at which the plunger first contacts the glass charge in order to allow clearance for bodily movement of the neck ring mold and the associated parison to transfer the latter along a curved path to an adjacent laterally spaced blow mold station at which the parison is further formed in a glass-blowing phase. The above-described process has been found quite satisfactory in the formation of glassware articles with large neck openings, such as bottles and jars or the like, especially where these articles may be provided with a relatively heavy wall thickness. However, in the manufacturing or relatively lightweight narrow necked glass containers the "press and blow method" has encountered difficulties due to variations in size, or weight of the glass gobs delivered to the blank molds. This disadvantage can be attributed to the fact that the pressing plunger must displace just the proper amount of the molten glass in order to properly fill the neck ring defining portion of the blank or parison cavity. The inevitable glass gob size variations which occur as a result of the conventional feeding devices presently available necessarily influence the quality of the product so that gob overweight tends to result in opening of split blank molds causing heavy seams, and gob underweight tends to result in unfilled finishes in the neck ring mold when a pressing process is used for the formation of parisons for lightweight narrow neck glass containers in glassware forming machine of the type described herein. Still another disadvantage to the use of a pressing plunger in the formation of lightweight narrow neck glass containers can be attributed to the fact that the pressing plunger must necessarily be relatively long in relationship to its cross-sectional size, a circumstance which creates serious problems in the formation of narrow neck glassware in a machine of the type wherein the blank mold, the neck ring mold, the baffle and the plunger must all be moved into registration with one another before insertion of the plunger in the formation of the parison. Any variation in the alignment of these various components especially variations in the alignment between the blank mold and the pressing plunger mechanism tends to result in a parison having unequal and unsymmetrical distribution of glass material with respect to its longitudinal axis.

A primary object of the present invention is to provide a plunger-operating mechanism for a glassware-forming machine wherein the plunger is free to shift laterally in its holder so as to accommodate variations in the alignment between the blank mold, the neck ring mold, and the plunger cylinder and holder mechanism.

Still another principal object of the present invention is to provide a pressing plunger for use in a glassware-forming machine wherein glass gobs of various size deposited in the upwardly open blank mold can be readily accommodated with a pressing plunger of predetermined stroke as a result of a unique baffle construction wherein the baffle portion of the blank mold is adapted to be moved vertically in response to the stroke of the pressing plunger to accommodate these glass gob weight variations.

Still another object of the present invention is to provide a plunger mechanism for use in a glassware-forming machine when producing lightweight glass containers, which plunger is operated by a unique fluid motor having an actuating rod which moves with a velocity which varies during its stroke in order to minimize the time during which the plunger is in contact with the glass parison, which plunger nevertheless does not have an excessive velocity during the upper limit of its travel with the resulting inertial effect of tending to separate the blank mold halves or to otherwise detract from the efficient formation of lightweight glassware containers.

A more specific object of the present invention is to provide a plunger mechanism wherein the pressing plunger is initially moved quite quickly in displacing the glass gob into contact with the walls of the blank mold and of the neck ring mold, but which plunger is decelerated during the upper limit of its travel as the molten glass is moved into final position in the blank mold.

Still another object of the present invention is to provide a plunger-operating mechanism and blank mold construction wherein over and under weight glass gobs of the type which have been found to be so troublesome to the formation of lightweight glass containers are accommodated by a novel baffle construction.

Still another object of the present invention is to provide a pressing plunger for the formation of lightweight narrow neck glass containers in a forming machine wherein the plunger is laterally adjustable in its holder during both its forming stroke and its return stroke, which plunger is also cooled by the circulation of a suitable fluid such as air carried to the plunger through a hollow piston rod restrained for movement along a predetermined vertical axis.

SUMMARY OF INVENTION

This invention relates to glassware-forming machines, and deals more particularly with a parison forming unit for such a machine wherein a pressing plunger operating mechanism is provided for forming the parisons necessary for making lightweight narrow neck glassware containers. The plunger is carried by an adapter at the upper end of the pressing cylinder actuating rod, and is free to move laterally with respect thereto in a floating sleeve carried by the fixed holder. Variations in alignment between the actuating cylinder and the parison cavity defining mold components can thereby be accommodated to provide a structurally symmetrical parison. The fluid operated actuating cylinder for moving the plunger is designed to have a stroke velocity which varies, at least during the upstroke, from a maximum to a minimum during the upper limit of plunger travel, and a baffle for closing the upper end of the blank mold is spring biased downwardly, having the ability to float upwardly to accommodate overweight glass gob charges being pressed by the plunger in the blank mold.

BRIEF DESCRIPTION OF DRAWINGS

FIG. 2 is a vertical sectional view of a portion of the apparatus shown in FIG. 1 with the plunger being shown in its glass gob or charge delivery position.

FIG. 3 is a vertical sectional view of a portion of the apparatus shown in FIGS. 1 and 2 with the plunger being shown in its neck ring clearance position.

DETAILED DESCRIPTION

Figure 1:
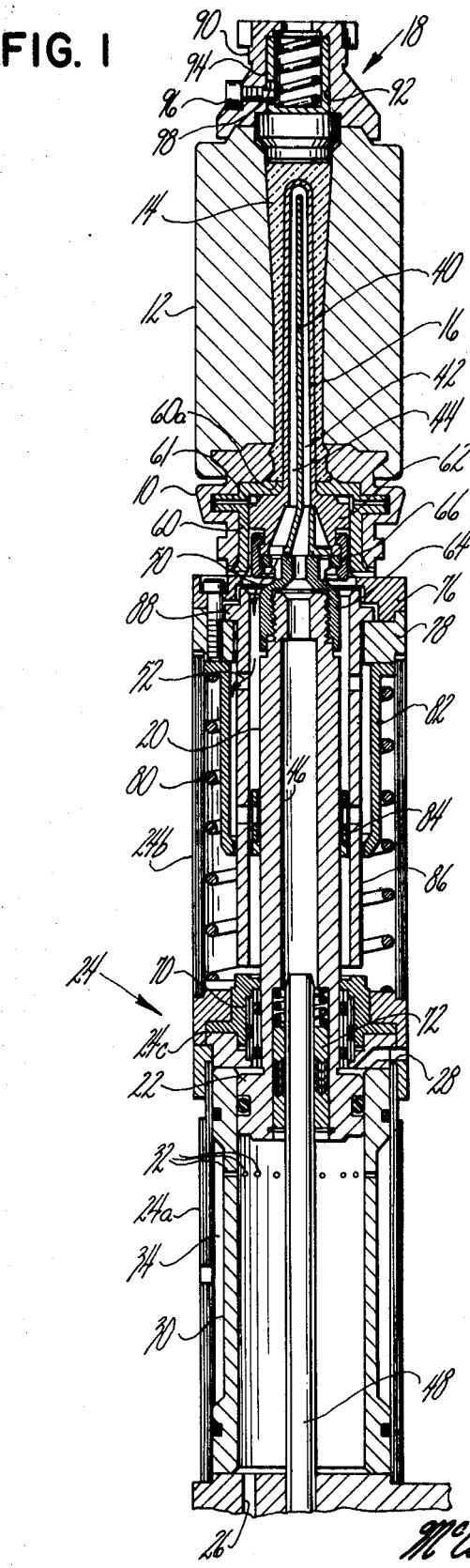
FIG. 1 is a vertical sectional view through an assembly of a plunger mechanism, a parison cavity defining mold assembly, and a baffle, the pressing plunger being shown in its raised position wherein the glass charge is adapted to entirely fill and intimately contact the interior mold surfaces.

Turning now to the drawings in greater detail, the essential components of a parison forming unit at the blank mold station of a Hartford I. S. type glassware-forming machine are shown in FIG. 1 with various improvements constructed in accordance with the present invention incorporated therein for forming parisons especially well suited to being blown into lightweight narrow neck glass containers by means of the "press and blow method." The pressing is accomplished at the parison is subsequently accomplished at a blow mold station (not shown) in the same machine, to which the parison is carried by the swinging neck ring mold 10 as best shown in FIG. 3.

The upwardly open blank mold 12 is adapted to receive a glass gob or charge 14 form suitable means (not shown) and is adapted to be received in the cavity defined by the blank mold so that the glass gob is supported in its molten condition on the plunger 16 as shown in FIG. 2. Suitable mechanism is provided for then inserting the baffle mechanism, indicated generally at 18 in FIG. 1, to close the upper end of the parison cavity defined by the blank mold 12. In accordance with the press and blow method of forming glass containers the plunger is then raised to the limit of its upward stroke as shown in FIG. 1 with the result that the glass gob is forced into intimate contact with the interior surfaces of the parison mold, defined in large part by the blank mold 12 but also defined by the neck ring mold 10. The neck ring mold and its thimble insert are adapted to form the neck portion of the parison and also the "finish" of the ware. The plunger is then withdrawn to the position shown in FIG. 3 and the blank mold and baffle separated from the parison to allow the neck ring mechanism (not shown) to swing the parison to the blow mold station in the glassware forming machine.

In accordance with the present invention improved means is provided for operating the plunger 16 to accommodate misalignment between the blank mold defining components, 10 and 12, and the axis of movement of the pressing cylinder actuating rod, indicated generally at 20 in FIG. 1. The particular floating plunger design utilized herein will now be described in detail. The actuating rod 20 of the pressing cylinder is attached to, or may comprise an integral part of, the fluid operated piston 22, which piston is slidably received in the lower portion of the fixed holder 24. The piston 22 is air operated in the upward direction through a port 26 defined in the lower wall of the holder, and is air operated in the downward direction through a passageway 28 defined in the fixed portion of the holder sidewall.

It is an important feature of the present invention that the piston 22 is of slightly smaller cross-sectional area than that of the lower portion 24a of the holder, and a cylinder sleeve or guide 30 is provided in the lower portion 24a of the holder 24 to permit the piston 22 to be of a reduced diameter, considerably less than that used with previous plunger mechanisms. The net result of this construction is to reduce the overall weight of the piston and actuating rod combination, with the result that higher speeds can be achieved with a given air pressure from the glassware forming machine source of air supply. As a result of the higher speed for the plunger the length of time during which the plunger is in contact with the molten glass is minimized, and this result contributes to the forming of parisons for lightweight or thin-walled glass containers. In order to reduce the inertia of the plunger during the time in the cycle of operation of the mechanism wherein the plunger reaches the upper limit of its travel, and to thereby prevent excessive forces on the blank mold, means is provided for decelerating the plunger during the upper limit of its travel to reduce its velocity just prior to reaching the position shown in FIG. 1. Preferably said means comprises a plurality of orifices 32, 32 in the cylinder sleeve 30 so that when the underside of the piston 22 reaches the level of these openings or orifices during its upward travel air pressure is vented through these orifices into an auxiliary air chamber 34, and ultimately vented to the atmosphere, with the result that the speed of the piston 22, and hence of the plunger 16, is substantially reduced just prior to reaching the position shown FIG. 1. This design for the fluid motor allows for greater plunger speed during the major portion of plunger travel, but avoids the adverse effect of excessive plunger and operating rod inertia which has been found to result in excessive forces on the blank mold. While a solid blank mold is shown in FIG. 1 it will be obvious that the plunger mechanism of the present invention might also be adapted for use in a split blank mold wherein excessive forces on the blank mold tend to open the blank mold creating heavy seams and causing other deleterious effects upon the parison.

The plunger 16 is relatively long in relationship to its cross-sectional area and is also hollow so as to be air cooled through passageways defined in the hollow interior of the plunger by a suitably formed insert or baffle 40. As shown, the baffle 40 cooperates with the hollow plunger to define an inlet side 42 and an outlet side 44 so that cooling air can by carried into the inlet side 42 from a bore 46 defined in the actuating rod 20, which bore 46 receives cooling air from a fixed tube 48 located in the fixed base of the holder and extending upwardly through the piston 22 in a conventional manner. As so constructed and arranged cooling air provided in the fixed tube 48 is continually circulated through the reciprocable actuating rod 20, and through the plunger 16 passing upwardly through the passageway 42 and downwardly through the passageway 44 in the plunger to be vented overboard following the path indicated generally by the arrows 50 and 52 in FIG. 1.

The neck ring mold 10 defining the neck portion of the parison is of conventional construction, and is fitted with a plunger guide or thimble 60 which thimble may serve to form the finish of the parison, as indicated generally at 60a in FIG. 1. The plunger 16 has a base 62 the outside diameter of which is substantially equivalent to the inside diameter of the lower portion of the thimble 60 so as to be slidably received and guided therein during its movement. As mentioned hereinabove the alignment between the plunger and the thimble 60 in the neck ring 10 may vary somewhat during operation of the glassware forming machine and it is an important feature of the present invention that this alignment can be accommodated and readily allowed for in an operating mechanism constructed in accordance with the present invention. The plunger base 62 is secured to the upper end of the plunger adapter 64, which adapter is in turn fixedly secured to the upper end of the piston rod 20 by conventional means. In accordance with the present invention a split or clamping ring 66 is provided between the upper end of the plunger adapter 64 and the base of the plunger 62 for holding the plunger 16 in position on tip of the plunger operating mechanism for movement therewith while at the same time allowing limited lateral movement thereof with respect to the axis of movement of the plunger rod 20. The base 62 of the plunger 16 has an external annular groove for receiving the upper annular internal rib of the clamping ring 66 and the lower rib of the clamping ring is received in a similar groove defined in the upper end of the plunger adapter 64. The clamping or split ring 66 is thus so arranged as to prevent relative vertical movement between the adapter and the plunger, while at the same time allowing limited lateral floating movement therebetween. It is also noted that the outside diameter of the split or clamping ring 66 is substantially equal to that of the outside diameter of the base 62 of the plunger 16 so that both are snugly received in the lower portion of the thimble 60, when the plunger is in its full up position as shown in FIG. 1.

The lower and upper portions of the holder, 24a and 24b respectively, are connected to one another by an annular assembly indicated generally at 24c with suitable bearing means 70 being provided for slidably receiving the piston rod 20, and bearing means 72 for slidably and sealingly engaging the interior bore 46 of the piston rod and separating the same from the fixed tube 48. The upper end of the holder 24b is fitted with a cap 76, which cap is secured to a spacer plate 78 to define the upper end portion of the holder 24. In order to define the charge delivery position shown in FIG. 2 for the plunger, a coiled compression spring 80 acts between the annular portion 24c of the holder and a flanged portion of a slidable sleeve 82 for urging the latter to the upper position shown. Reduced air pressure through the inlet port 28 in the holder causes the plunger and piston rod to be withdrawn form the raised position shown to an intermediate position shown in FIG. 2 wherein the lower edge of the clamping ring 66 engages a spacer ring 84 supported on the lower wall of the generally cup-shaped slidable sleeve 82. Increased air pressure at the port 28 causes the force of the compression spring 80 to be overcome resulting in further downward movement of the plunger to the position shown in FIG. 3 referred to hereinabove as the neck ring mold clearance position.

In further accordance with the present invention means is provided in the holder for aligning the clamp ring 66 and the base of the plunger 62 with the downwardly open receptacle defined in the lower portion of the thimble 60 during reciprocating movement of the plunger 16. Preferably, said means comprises a floating sleeve 86 mounted in depending relationship form the cap 76 and having an external annular rib adjacent its upper end as shown at 88, which rib is loosely received in an annular groove defined in part by the cap 76 and in part by a spacer plate 78 as showing 1 As so constructed and arranged the sleeve 86 is free to float laterally so as to align itself with the opening in the thimble 60 during the first stroke of the plunger 16 with the result that the plunger 16 shifts on the plunger adapter 64 to an appropriate position for aligning itself with the axis of the blank mold and of the neck ring mold 10. If the axis of the mold defining components remains aligned with the axis of the floating sleeve 86 during further operation of the unit shown no further floating movement of the sleeve is required. However, if for some reason the movable blank and neck ring mold parts shift slightly with respect to the fixed holder 24 the floating sleeve 86 accommodates these movements and tends to retain the plunger 16 and more particularly the base portion 62 thereof in alignment with the axis of the blank mold.

In further accordance with the present invention, means is provided in the mold components for accommodating glass gob or glass charge weight variations from a predetermined standard to permit the positive displacement pressing plunger 16 to operate without exerting excessive forces on the blank mold. According to the invention this result is accomplished by constructing the plunger so that it always operates to a predetermined height as shown in FIG. 1 wherein the plunger base 62 engages the inside surface 61 of the thimble. The baffle 18 is so constructed, however, as to accommodate any variations in the volume or weight of the glass gob being pressed. More particularly, the baffle 18 comprises an outer housing part 90 defining a downwardly open cavity 92 in which a baffle part 94 is slidably received. The lower part of the baffle 94 is suitably formed for being received in the funnel-shaped top opening of the blank mold, and forms the inverted lower portion of the parison. The baffle part 94 is spring biased downwardly to a position defined by the pin 96 in the outer housing 90. More particularly the pin 96 is loosely received in a slot 98 in the baffle part 94 and at the particular location shown in FIG. 2 the baffle is adapted to accommodate a minumum glass gob size or weight. With the pin 96 engaging the opposite end of the slot, as is shown in FIG. 1, a glass gob size or weight of maximum size or weight is accommodated. Thus, glass gob size or weight variations can be readily accommodated by a baffle designed to float within predetermined limits in a baffle housing which is adapted to sequentially close the upper end of the blank mold by conventional mechanism (not shown) during operation of the glassware forming machine.

As mentioned hereinabove, the plunger 16 has an internal baffle or insert 40 which defines the cooling fluid passageways 42 and 44. This insert 40 is also free to shift laterally with the plunger 16, and an annular seal is provided between the base of the insert and the upper end of the plunger adapter to prevent leakage therebetween. The seal is fitted in an oversize opening in the adapter and therefor does not interfere with limited lateral floating movement of the plunger.

We claim:

1. In a glassware forming machine of the type having an inverted blank mold and a neck ring mold therebelow, both of which are cyclically movable form and to mating positions with one another, the improvement comprising a plunger mechanism which includes a fixed holder, a fluid operated motor including a piston slidably received in said holder and an actuating rod extending upwardly therefrom for fluid operated movement between up and down positions, a glass gob forming plunger having a base, means for attaching said plunger base to the upper end of said piston rod to allow limited lateral movement therebetween, a thimble in said neck ring mold for slidably receiving said plunger base during the upper limit of piston rod travel, a guide sleeve slidably received in said holder and having a lower wall with an opening for slidably receiving said piston rod, biasing means for urging said sleeve upwardly against a stop defined in said fixed holder, means carried by said sleeve for supporting said plunger in an intermediate position and a floating sleeve loosely received in said holder for limited lateral movement therein, said floating sleeve having an internal bore of substantially the same diameter as that of said thimble for continuously aligning said plunger base with said thimble during the major portion of piston rod travel when said plunger base is not received in said thimble.

2. The combination defined in claim 1 further characterized by said means for attaching said plunger base to said piston rod comprising an adapter fixedly secured to the upper end of said piston rod and defining an external annular groove adjacent its upper end, said plunger base defining an external annular groove adjacent its lower end, a split ring of C-shaped cross section with internal upper and lower ribs received in said respective grooves, said split ring holding said plunger against movement vertically with respect to said adapter but allowing limited lateral movement with respect thereto.

3. The combination defined in claim 1 further characterized by means for decelerating the piston rod and attached plunger during the limit of upward travel thereof, said means comprising ports defined in said fixed holder for exhausting some of the fluid under pressure used in raising the piston.

4. The combination defined in claim 3 further characterized by a baffle for closing the open upper end of said blank mold, said baffle being vertically movable in said blank mold to allow for minor changes in the sizes of glass gobs delivered thereto, and means for biasing said baffle toward a down position with a force which can be overcome during the limit of upward travel of said pressing plunger in the event that the glass gob charge exceeds some predetermined minimum size.

5. The combination defined in claim 1 further characterized in that said holder has a cap at its upper end, which cap defines an internal annular groove, and said floating sleeve having an external annular rib adjacent its upper end, which rib is loosely received in said groove, said floating sleeve being otherwise unsupported so as to be readily displaced laterally during movement of said plunger therein.

6. The combination defined in claim 1 further characterized by means for providing cooling fluid to the hollow interior of said piston rod, said means for attaching said plunger to the upper end of said piston rod including an adapter having a port through which the cooling fluid flows to the hollow interior of said plunger, and an annular seal between said plunger and said adapter for preventing fluid leakage therebetween without preventing limited lateral floating movement therebetween.

7. The combination defined in claim 5 further characterized by an outlet for said cooling fluid between said hollow plunger and said adapter, said cooling fluid being exhausted downwardly between said floating sleeve and said piston rod after cooling said plunger.

8. The combination defined in claim 7 further characterized by said hollow plunger having a continuous passageway for said cooling fluid, said passageway being defined in part by the hollow interior of said plunger and in part by a plunger insert, which insert has an annular groove for receiving said annular seal.

9. The combination defined in claim 3 further characterized in that said means for decelerating the piston during limit of its upward travel comprises an annular piston guide fixedly mounted in said holder and said ports being defined in said piston guide and communicating with an auxiliary chamber defined between the internal cylinder wall of said holder and the contoured exterior wall of said piston guide.

10. The combination defined in claim 4 further characterized in that said holder has a cap at its upper end, which cap defines an internal annular groove, ans said floating sleeve having an external annular rib adjacent its upper end, which rib is loosely received in said groove, said floating sleeve being otherwise unsupported so as to be readily displaced laterally during movement of said plunger therein.

PO-1050
(5/69)

UNITED STATES PATENT OFFICE
CERTIFICATE OF CORRECTION

Patent No. 3,607,206                    Dated September 21, 1971

Inventor(s) Thomas V. Foster and Hermann H. Nebelung

It is certified that error appears in the above-identified patent and that said Letters Patent are hereby corrected as shown below:

Col. 1, line 7, following "method" insert --molten--.
        Col. 3, line 20, following "14" delete "form" and substitute --from--.
        Col. 4, line 7, following "shown" insert --in--.
        Col. 4, line 56, following "on" insert --top-- and cancel "tip".
        Col. 5, line 12, cancel "form" and substitute --from--.
        Col. 5, line 27, following "relationship" cancel "form" and substitute --from--.
        Col. 5, line 30, following "as" cancel "showing" and substitute --shown--.
        Col. 5, line 30, following "showing" cancel "1" and insert -- . --.
        Col. 8, line 8, following "groove" cancel "ans" and substitute --and--.

Signed and sealed this 4th day of April 1972.

(SEAL)
Attest:

EDWARD M. FLETCHER, JR.              ROBERT GOTTSCHALK
Attesting Officer                      Commissioner of Patents